Oct. 24, 1939.  J. M. MILAN  2,177,372
BRAKE
Filed July 9, 1937  3 Sheets-Sheet 1
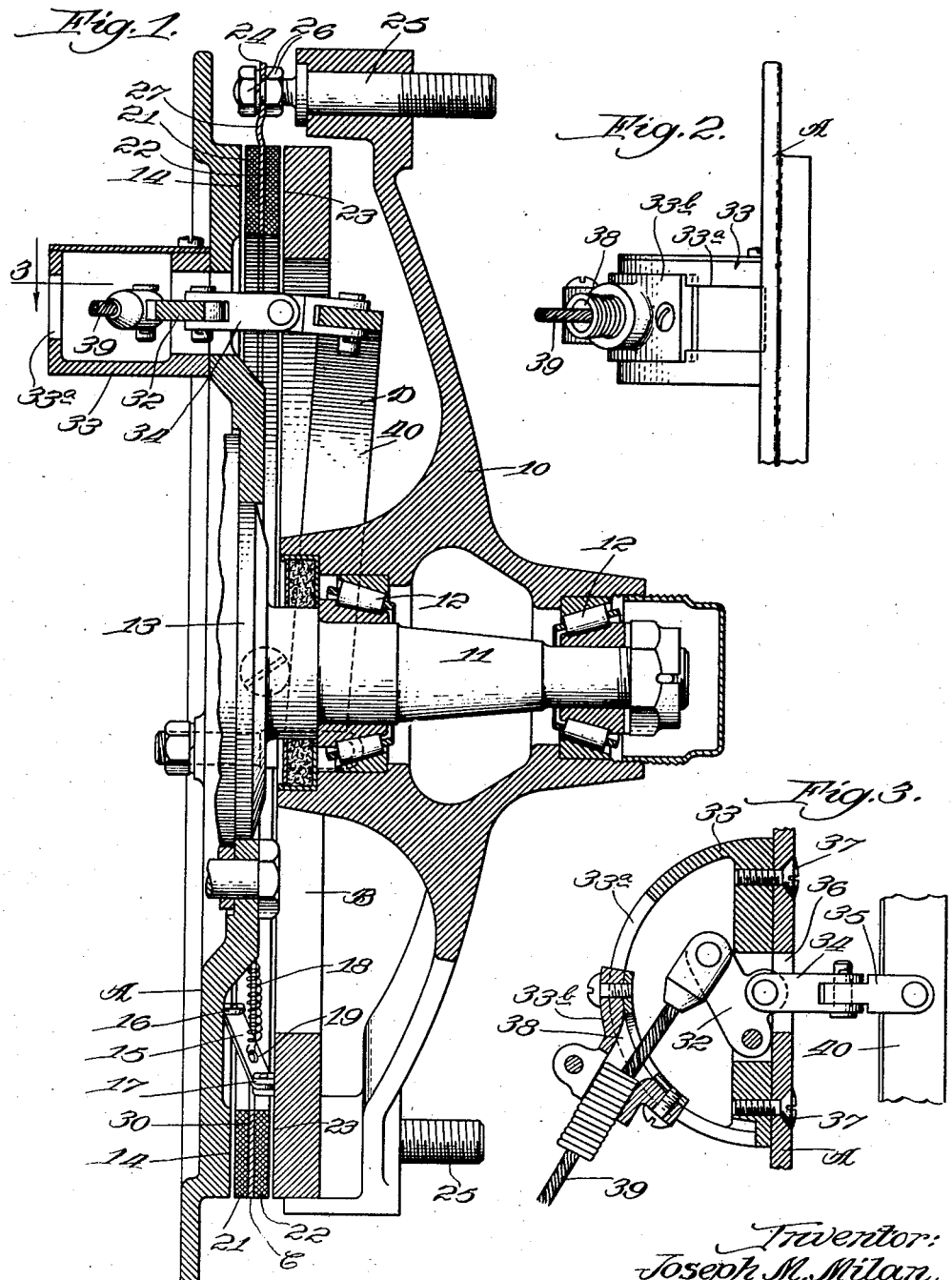
Inventor:
Joseph M. Milan.
By Chittan, Wiles, Davis, Hirschl, Dawson
Attys.

Oct. 24, 1939.  J. M. MILAN  2,177,372
BRAKE
Filed July 9, 1937   3 Sheets-Sheet 2

Inventor:
Joseph M. Milan.
By Chritton, Wiles, Davies, Hirsch & Dawson.
Attys.

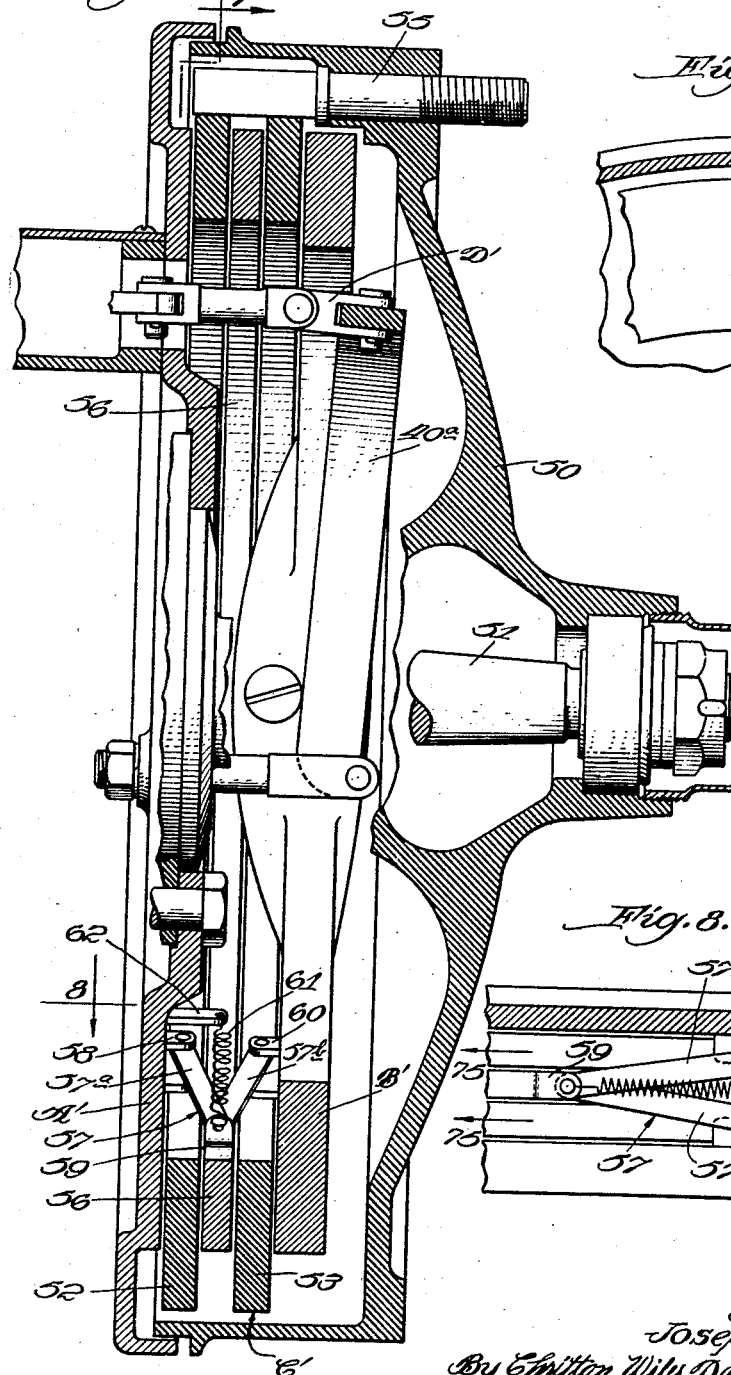

Patented Oct. 24, 1939

2,177,372

UNITED STATES PATENT OFFICE 2,177,372

BRAKE

Joseph M. Milan, Chicago, Ill.

Application July 9, 1937, Serial No. 152,827

9 Claims. (Cl. 188—72)

This invention relates to a brake and more particularly to a disk brake well adapted for use on automobiles and other motor vehicles.

An object of the invention is to provide a brake of sturdy construction and high efficiency, and which may be operated with but a minimum of effort.

A specification object is to provide a brake of the disk type in which the engagement between the frictional surfaces is itself made use of in building up a force which is effective in bringing the frictional surfaces into yet closer engagement. In utilizing the frictional force due to the contact between the friction surfaces for building up a greater pressure normal to the friction surfaces, a greater amount of braking action is obtained with but slight effort on the part of the operator of the automobile or other vehicle.

A further object is to provide a disk type brake employing a flexible disk having frictional surfaces and being resiliently held out of contact with the plates when the mechanism is not actuated for braking action.

Yet another object is to provide such a brake having improved actuating mechanism for utilizing the movement of a brake rod or cable for operating the brake. Other objects will be apparent as the specification proceeds.

Figure 4:
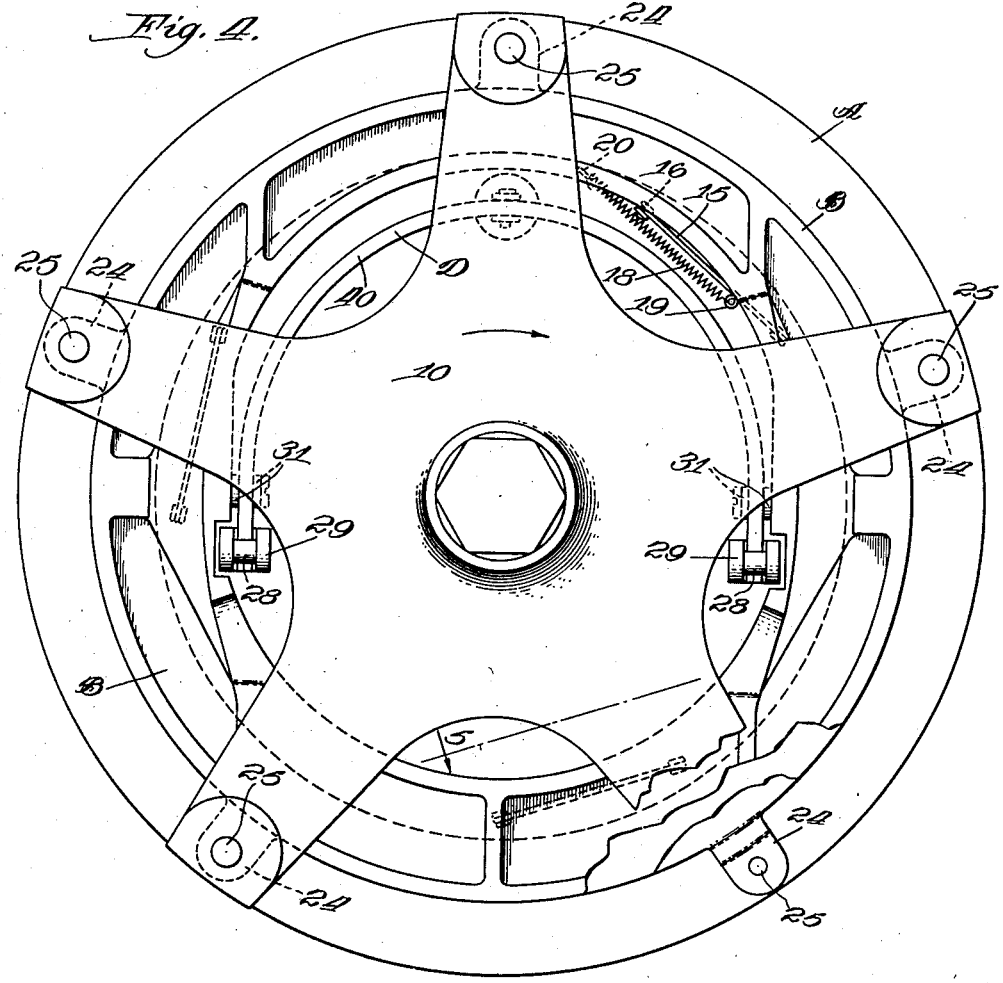
Figure 5:
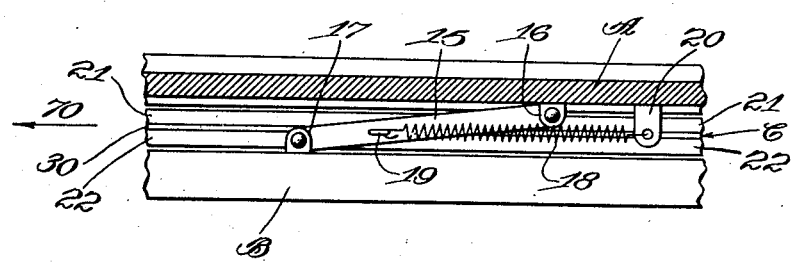

A preferred embodiment of my invention is illustrated in the accompanying drawings in which:

Figure 1 is a vertical sectional view of my improved brake as applied to the right front wheel of a vehicle; Figure 2, a detail elevational view of the auxiliary housing attached to the inside of the backing plate; Figure 3, a plan sectional view of the housing as shown in Figure 2, and illustrating the brake actuating mechanism; Figure 4, a broken side elevational view of the structure shown in Figure 1; Figure 5, a detail sectional view showing one of the links connecting the pressure plate with the backing plate, the section being taken as indicated at line 5 of Figure 4; Figure 6, a sectional view in elevation of a modified form of the invention; Figure 7, a detail sectional view taken as indicated at line 7 of Figure 6; and Figure 8, a detail sectional view illustrating the links connecting the middle disk with each of the plates, the section being taken as indicated at line 8 of Figure 6.

As illustrated in Figures 1 to 5, A designates the backing plate; B, a pressure plate; C, a friction disk; and D, mechanism for moving the pressure plate toward the backing plate.

The improved brake construction may be used in connection with any common form of wheel and axle assembly such as the one illustrated in which the wheel 10 is rotatably mounted on the axle 11 by the use of roller bearings 12. This wheel and axle assembly in itself forms no part of the invention, and is here shown only to illustrate a particular function of the improved brake.

The backing plate A may be considered the stationary plate and may be mounted to the vehicle in any suitable way. In the illustration given this plate is fixedly secured with the base 13 of axle 11. On its outside and near its outer periphery backing plate A provides the annular braking surface 14 which is preferably smooth and in a single plane.

The pressure plate B comprises an annular piece having its outer peripheral edge preferably coextensive with the outer peripheral edge of surface 14 on backing plate A. Plate B is supported and spaced from plate A by means of the links 15 which at their one ends are pivotally secured between lugs 16 on plate A, and which at their other ends are pivotally secured between lugs 17 on plate B. In the illustration given three such links are shown, but any number may be used as may be desired. The links 15 are angularly disposed with respect to the plates, and the ends of the links connected with lugs 17 of the pressure plate B are disposed farther forward in the direction of forward rotation of wheel 10.

The disk C, annular in form, extends between plate A and plate B, and comprises a flexible metal member 30 which has on its one side the friction ring 21 providing a friction surface adjacent braking surface 14 of backing plate A, and has on its other side the friction ring 22 providing a friction surface adjacent the braking surface 23 on pressure plate B. At spaced intervals about the periphery of the flexible metal member 30 are the attachment ears 24 extending beyond the general circular periphery of the disk.

Wheel bolts 25 secured in wheel 10 have their inward ends extending through apertures in ears 24 and are fixedly secured with disk C by the nuts 26 on each side of ears 24. The member 30 of disk C should be of some flexible resilient material, so that when pressure plate B is moved toward the backing plate A member 30 will yield to allow the friction ring 21 to be brought into contact with braking surface 14. To aid in this function each of ears 24 is provided with a crimped portion 27. It is also necessary that member 30 be sufficiently resilient to return the rotatable disk C to the position shown in Figure 1, moving ring 21 free from contact with braking surface 14 when pressure plate B is returned to normal spaced position.

The means D for moving the pressure plate B toward the backing plate A comprises a yoke lever 40 of U-shaped form which has its lower ends pivoted under bearing 28 of the bracket pins 29 which are fixedly mounted on the backing plate A. As clearly shown in Figure 4 of the drawings, the bracket pins 29 are disposed slightly below the middle of the brake. Mounted at diametrically opposite points on the pressure plate B are the rollers 31 which bear against the arms of yoke lever 40, and when actuated by this lever serve to move plate B inwardly toward backing plate A.

The actuating mechanism for operating yoke lever 40 includes a lever 32 which is pivotally mounted about a vertical axis in the auxiliary housing 33 carried by the backing plate A. As shown more clearly in Figure 3 of the drawings, this lever is connected by means of links 34 and 35 with the top portion of yoke lever 40. The pivotal connection between links 34 and 35 allows the link 34 to extend horizontally through the opening 36 in backing plate A at all positions of the yoke lever.

The housing 33 is preferably of semi-cylindrical form having its straight wall secured to the backing palte A by means of screws 37 or any other suitable means. The curved wall of the housing is preferably provided with an opening 33ᵃ in which is mounted a wall portion 33ᵇ arranged to slide along this opening. A cable 39 extends through the opening 38 of the movable portion 33ᵇ and has its end pivotally connected with the end of the lever 32. This construction is such that when cable 39 is pulled to move lever 32 about its pivot the yoke lever 40 is moved inwardly at the top to bring the mechanism into braking position.

Illustrated in Figures 6 to 8 of the drawings is a modified form of my improved brake. This form of the brake is shown in connection with a wheel 50 mounted on an axle 51. Similar to the preferred embodiment, this construction includes a backing plate A' fixedly secured with axle 51, and a pressure plate B' mounted in spaced relation to the plate A'. The actuating mechanism D' is substantially identical with mechanism D already described in connection with the preferred embodiment.

The rotatable disk means C' includes a pair of disks 52 and 53 which have their peripheral edges extending beyond the outer edge of pressure plate B' and receive within their peripheral slots 54 the inner end portions of wheel bolts 55. In this way the disks 52 and 53 are supported between plates A' and B' and are caused to rotate with wheel 50. Disposed between disks 52 and 53 is an annular middle disk 56 which is supported and connected with plates A' and B' by means of pairs of links 57. Each pair of links 57 includes a link 57ᵃ which is pivotally connected at its rearward end with lug 58 on backing plate A', and at its forward end with a lug 59 of middle disk 56. Another link 57ᵇ has its rearward end pivotally connected with lug 60 on pressure plate B', and has its forward end pivotally connected with link 57ᵃ to the lug 59 on middle disk 56. Any number of such link pairs 57 may be used as may be desired.

For maintaining plates A' and B' normally apart and out of contact with rotatable disks 52 and 53, I provide the springs 61 which at their one ends are connected with lugs 59 of the middle disk 56 and at their other ends are connected with lugs 62 protruding from backing plate A'. One of springs 61 is preferably associated with each of the link pairs 57.

Operation

Referring to the first described embodiment of the invention, when cable 39 is pulled to effect braking action, lever 32 within housing 33 is caused to move about its point of pivot and through connection by links 34 and 35 causes the yoke lever 40 to move inwardly. In moving inwardly yoke lever 40 pivots about the bearing 28 of the bracket pins 29 and presses against the rollers 31 causing the pressure plate B to move inwardly.

When surface 23 of the pressure plate comes into frictional contact with friction ring 22 of the rotatable disk C which is here assumed to be in rotation, a frictional force is developed which tends to urge the pressure plate B to rotate along the disk C. Pressure plate B, being connected to backing plate A by the links 15, is not permitted to rotate, but may move slightly in an angular direction. However, in order for this slight angular movement to take place, links 15 must move toward alignment with the plane of rotation, bringing plates A and B toward each other against the tension of springs 18. Thus, when the operator has exerted sufficient effort to bring the pressure plate B into frictional contact with the rotating disk to produce a frictional force effective for braking action, this frictional force is utilized by link connections 15 to press plates A and B yet more tightly against the rotating disk C, producing a greater force normal to the friction surfaces, and intensifying or building up the resulting braking action.

This function of the links 15 may be more clearly understood by reference to Figure 5 of the drawings in which the arrow 70 indicates the normal forward direction of rotation of the rotatable disk C. As the pressure plate B comes into contact with the friction ring 22 of the rotating disk C, a force is built up which tends to move plate B in the direction of arrow 70. A component of this force is effective in urging the plate B toward the backing plate A against the tension of spring 18. It is this component which is effective in building up or intensifying the braking action. In such an arrangement where the force effective in producing braking action is capable of intensifying or building itself up, very little effort is required on the part of the operator to produce even a very strong braking action.

As the yoke lever 40 moves inwardly to narrow the spacing between plates A and B, the body portion of disk C which carries the friction rings 21 and 22 will be pressed inwardly by plate B so as to bring the friction ring 21 into frictional contact with the braking surface 14 on plate A. This movement is permitted because of the flexibility of the disk member 30, and is aided by the crimped portions 27 adjacent the points of attachment of ears 24 with the wheel bolts 25. It will be seen that wheel 10 is mounted at fixed spacing from backing plate A, and in order for the disk C to move into contact with plate A, this disk must flex.

When the operator releases the tension on cable 39 so as to allow the yoke lever 40 to move outwardly, the tension in spring 18 is effective in pulling the links 15 back into their original position and increasing the spacing between plates A and B so as to move these plates out of contact with the rotatable disk C. When the lateral pressure exerted by pressure plate B against the rotatable disk C is relieved, the body portion of disk C carrying the friction rings 21 and 22 will move back to its original position due to the resiliency of the flexible member 30, causing the friction ring 21 to move out of contact with the braking surface 14.

The rollers 31 which bear against the yoke lever 40 play an important part in permitting the building up of a braking force which was described above. As previously stated, when the pressure plate B comes into contact with the rotating disk C, plate B moves inwardly toward plate A and also moves a slight distance in an angular direction. Yoke lever 40, bearing upon bracket pin 29 secured to the plate A, is not adapted even for slight angular movement, and the rollers 31 permit plate B to move angularly with respect to the yoke lever, enabling relative movement of the plates. At the same time, provision of rollers 31 prevents binding and helps to make a free working mechanism.

The brake actuating mechanism herein described is especially advantageous when used in connection with the front or steering wheel of the vehicle. When making turns the front wheel and also backing plate A is turned to a different angle with the vehicle, and in ordinary constructions turning of the front wheel causes a variation in the braking force applied at this wheel. Also, it will be observed that the force applied to pull yoke lever 40 inwardly is always in a direction substantially perpendicular with or normal to plate A. Such feature also eliminates binding and makes for uniform braking action.

As the front wheel is turned for steering the vehicle and as the angle which cable 39 makes with the plate A is changed, the movable piece 30ᵇ of the auxiliary housing 33 slides along the opening 33ᵃ. In this way the cable 39 while being adequately housed is not bent or otherwise deformed upon the turning of the front wheel.

In the operation of the modified form of the invention shown in Figures 6 to 8, the yoke lever 40ᵃ is moved inwardly to move pressure plate B' toward backing plate A' in the same manner as set forth in connection with the embodiment first described. When pressure plate B' has moved inwardly so as to bring the middle disk 56 into frictional contact with the rotatable disks 52 and 53, a building-up or self-serving action takes place which is similar in many respects with that described in connection with the other embodiment of the invention. The frictional force due to contact of disks 52 and 53 with middle disk 56 tends to carry this middle disk 56 in the direction of rotation of wheel 50 and rotating disk C'. This force tending to move middle plate 56 in an angular direction is utilized by brake link pairs 57 to pull plates A' and B' together, increasing the force normal to the friction surfaces and intensifying the resultant braking action.

In addition, the frictional force due to contact with the rotatable disks tends to urge the pressure plates A' in the direction of wheel rotation, and this tendency also contributes in the building-up of the braking action.

When the operator releases the brake allowing yoke lever 48 to move outwardly to normal position, spring 61 pulls the forward ends of links 57ᵃ and 57ᵇ in a rearward direction, causing the plates to move apart and free the friction surfaces. The building-up or self-serving action of this double link construction is perhaps more easily understood by reference to Figure 8 in which the direction of forward rotation of the disks 52 and 53 is indicated by arrows 75.

In the above explanation of the operation in connection with both of the embodiments described, it has been assumed that the wheel to which the rotatable disks were attached was rotating in a normal forward direction. The building up or intensifying action referred to will take place only when the rotatable disks rotate in this forward direction. With the rotatable disks moving in a reverse direction, the action of the links in each of the embodiments will be such as to diminish slightly the pressure normal to the friction surfaces and so will require a relatively greater effort on the part of the operator to obtain a certain braking action. However, in the usual operation of vehicles the braking action is most frequently desired when the vehicle is moving forwardly, and when the vehicle is moved rearwardly very low speeds are used and not so much braking force is required.

Referring particularly to Figure 5, it will be clear that if links 15 are made relatively longer so that at the same spacing of the plate the links will be more nearly aligned with the plane of rotation of disk C, although the force tending to move pressure plate B angularly in the direction of rotation be the same, the component of this force which is effective for moving the pressure plate toward the backing plate will be relatively less. Thus, by increasing the length of links 15, the tendency to build up or intensify the braking action will be diminished, and by shortening these links such action will be increased. From this it is apparent that by making links 57ᵃ and 57ᵇ of the modification longer the tendency to build up braking action will be diminished, and that by shortening these links the building up tendency may be increased.

While I have shown and described only specific embodiments of my invention, it will be apparent that many changes may be made in the details of construction without departing from the spirit of my invention. The foregoing detailed description has been given for clearness of understanding only, and no unnecessary limitations should be understood therefrom, but the appended claims should be construed as broadly as permissible, in view of the prior art.

What I claim as new, and desire to secure by Letters Patent, is:

1. A brake of the character set forth comprising a backing plate, a pressure plate spaced from said plate, a pair of rotatable disks between said plates, a middle disk between said rotatable disks, means for moving said pressure plate toward said backing plate to bring said rotatable disks into contact with said middle disk, and a pair of links pivotally connected at their one ends with said middle plate, one of said links being pivotally connected at its other end with said backing plate and the other of said links being pivotally connected at its other end with said pressure plate, said links being adapted upon rotation of said rotatable disks in one direction and upon frictional contact between said middle disk and said rotatable disks to urge said pressure plate toward said backing plate.

2. A brake as set forth in claim 1 and including means associated with said links for maintaining said plates in spaced relation with said middle disk and out of contact with said rotatable plates except when said first-mentioned means is operated.

3. A brake of the character set forth comprising a backing plate, a pressure plate spaced from said plate, a rotatable annular disk suspended between said plates from a plurality of studs secured to the vehicle wheel and to the outer periphery of said disk, means disposed within said annular disk for moving said pressure plate in a direction toward said backing plate, said means including a yoke lever pivotally mounted on said backing plate and a roller mounted on said pressure plate and bearing against said yoke lever, said pressure plate being angularly movable through actuation by frictional force set up by frictional contact between said rotatable disk and said plates, and means for moving said pressure plate toward said backing plate as said angular movement of said pressure plate takes place.

4. In a brake mechanism having a backing plate, a movable plate, a friction disk interposed between said backing plate and said movable plate, and a lever for moving said movable plate toward said backing plate, lever actuating mechanism including an actuating lever pivoted about an axis fixed with respect to said backing plate, connecting means attached to one end of said actuating lever, and link means extending through an opening in said backing plate, said link means being connected at its one end with said actuating lever and being connected at its other end with said first-mentioned lever, and said link means comprising two parts which are pivotally connected about an axis transverse with said first-mentioned axis.

5. In apparatus of the character set forth having a backing plate, a movable plate, a friction disk interposed between said backing plate and said movable plate, and a lever for moving said movable plate towards said backing plate, the combination of a housing secured to said backing plate, an actuating lever pivotally carried within said housing, link means connecting said actuating lever with said first-mentioned lever, and connecting means extending through an opening in said housing and having its end secured with an end of said actuating lever, said housing having a stationary portion and a movable portion, and said connecting means including a cable extending through an opening in said movable portion.

6. A brake of the character set forth comprising a backing plate, a presure plate spaced from said plate, a pair of rotatable disks between said plates, a middle disk between said rotatable disks, means for moving said pressure plate toward said backing plate to bring said rotatable disk into contact with said middle disk, and connecting means between said backing plate, pressure plate and middle disk, said connecting means being adapted upon rotation of said rotatable disks in one direction and upon frictional contact between said middle disk and said rotatable disks to urge said pressure plate toward said backing plate.

7. A brake of the class set forth comprising a backing plate, a pressure plate spaced from said backing plate, a rotatable disk, a friction disk adapted to engage said rotatable disk, means for moving said pressure plate toward said backing plate to bring said rotatable disk into frictional contact with said friction disk, and connecting means between said backing plate, pressure plate and said friction disk, said connecting means being adapted upon rotation of said rotatable disk in one direction and upon frictional contact between said friction disk and said rotatable disk to urge said pressure plate toward said backing plate.

8. A brake of the class set forth comprising a backing plate, a pressure plate spaced from said backing plate, a pair of rotatable disks between said plates, a middle disk between said rotatable disks, means for moving said pressure plate toward said backing plate to bring said rotatable disks into contact with said middle disk, and a plurality of pivotally mounted members connecting said backing plate, pressure plate and middle disk, said connecting members being adapted upon rotation of said rotatable disks in one direction and upon frictional contact between said middle disk and said rotatable disks to urge said pressure plate toward said backing plate.

9. A brake of the character set forth comprising a backing plate, a pressure plate spaced from said plate, a rotatable annular disk driven by the vehicle wheel and suspended between said plates from a plurality of points on its outer periphery, means disposed within said annular disk for moving said pressure plate in a direction toward said backing plate, said means including a yoke lever pivotally mounted on said backing plate and a bearing member carried on said pressure plate and bearing against said yoke lever, said pressure plate being angularly movable through actuation by frictional forces set up by frictional contact between said rotatable disk and said plates, and means for moving said pressure plate toward said backing plate as said angular movement of said pressure plate takes place.

JOSEPH M. MILAN.